United States Patent [19]

Friedrichs

[11] 4,076,627
[45] Feb. 28, 1978

[54] MESH WEAVE FILTER

[76] Inventor: Dieter Friedrichs, 47 Eichendorffstrasse, Neu-Ehrenfeld, Germany

[21] Appl. No.: 630,238

[22] Filed: Nov. 10, 1975

[30] Foreign Application Priority Data

Nov. 16, 1974 Germany .............................. 2454390
Jul. 12, 1975 Germany .............................. 2531222

[51] Int. Cl.² ............................................. B01D 39/10
[52] U.S. Cl. ..................................... 210/499; 55/522; 139/425 A
[58] Field of Search .......................... 55/522; 210/499; 139/425 A

[56] References Cited

U.S. PATENT DOCUMENTS

| 2,423,547 | 7/1947 | Behlen | 210/499 |
| 2,755,047 | 7/1956 | Duren | 139/425 A |
| 3,388,805 | 6/1968 | Lovett | 210/499 |
| 3,473,576 | 10/1969 | Amneus | 210/499 |
| 3,502,116 | 3/1970 | Crawford | 210/499 |

FOREIGN PATENT DOCUMENTS 980,288  1/1965  United Kingdom ............ 139/420 R

Primary Examiner—Bernard Nozick
Attorney, Agent, or Firm—Behr & Woodbridge

[57] ABSTRACT

The invention relates to a filter fabric, particularly of single-strand metal- or plastics filaments, in which one system of the two intersecting systems of filaments consists of filaments of thicker, mutually equidistantly spaced filaments extending in a straight line and the other system of thinner, sinusoidal filaments which are mutually juxtaposed as closely as possible and which embrace the thicker filaments and in which the filter gauge is determined by the diameter $\mu$ of the largest measuring sphere which passes through the apertures in the triangular pores of the fabric which are each formed by a thicker filament and two adjacent, phase-displaced, thinner filaments. The expression "filaments" embraces metal wires as well as plastics filaments.

8 Claims, 13 Drawing Figures

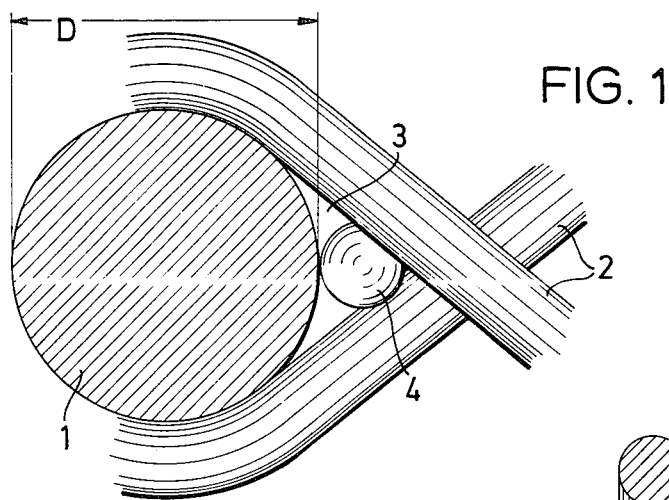
FIG. 1
FIG. 2
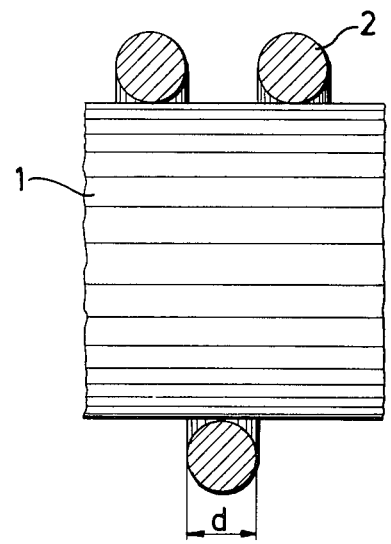
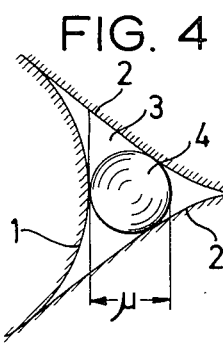
FIG. 4
FIG. 3
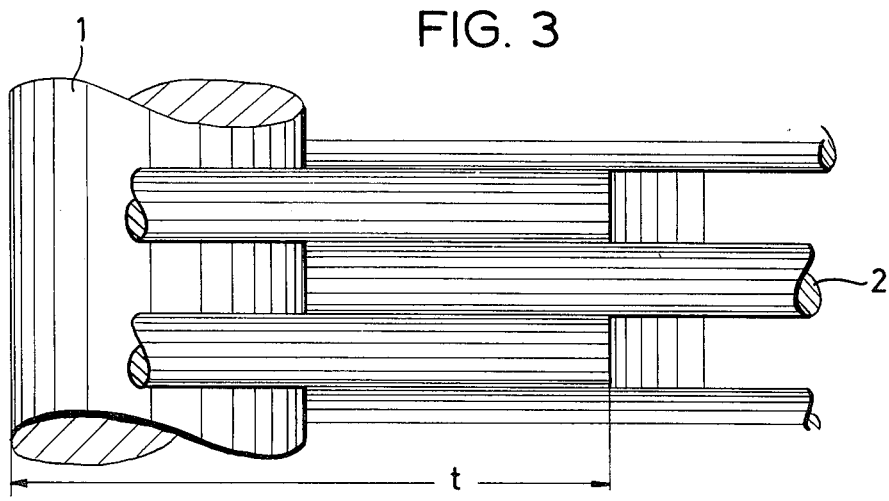

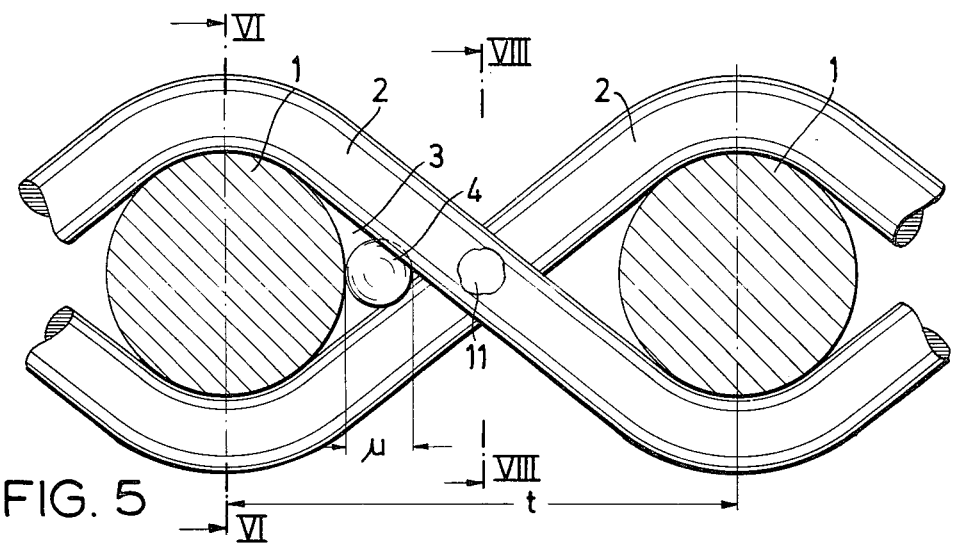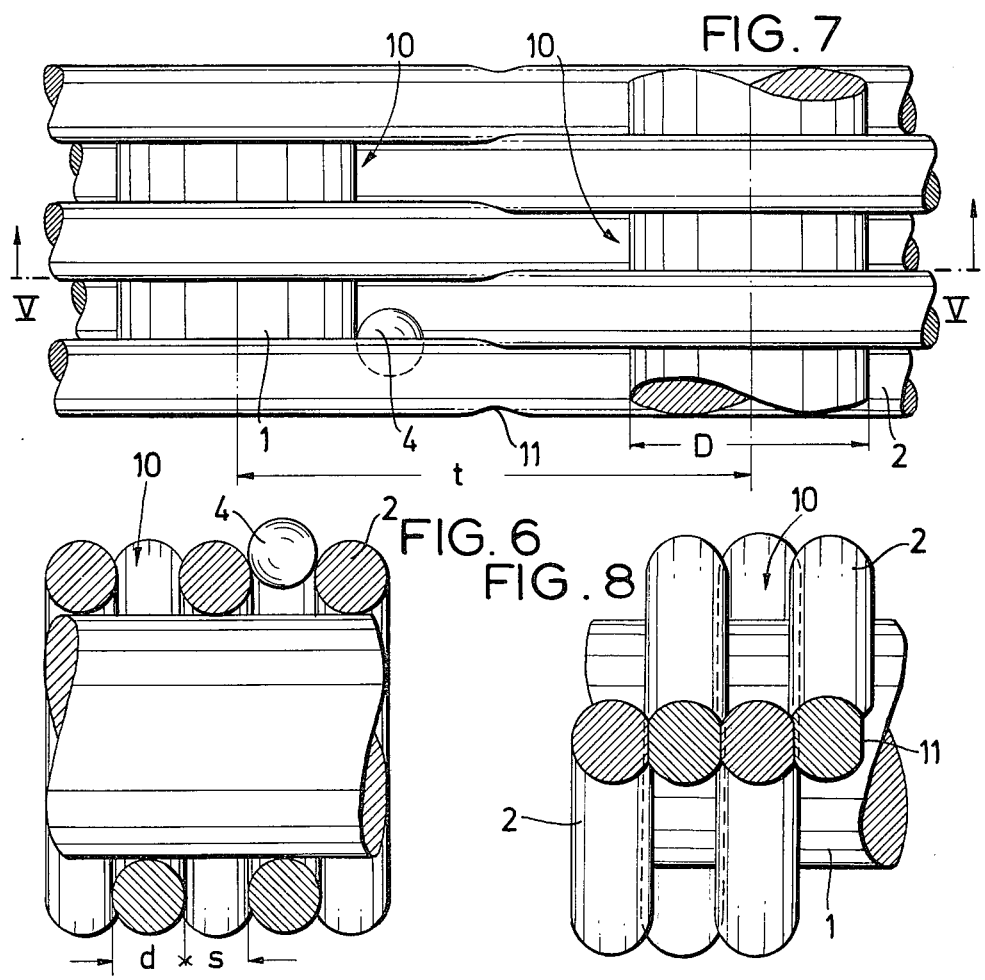

MESH WEAVE FILTER

DESCRIPTION OF THE PRIOR ART

Filter fabrics of this kind are, for example, known from the German patent specification No. 884,927. The manner in which these filter fabrics is made is such that relatively widely spaced warp filaments are tensioned and then thinner weft filaments are introduced and so closely pushed together that they are mutually contiguous. In the so produced fabric the thicker warp filaments extend in straight lines, whilst the thinner weft filaments embrace the warp filaments and consequently extend in an undulating or zig-zag manner. It is, however, also possible to produce such a fabric in a manner such that the warp filaments are positioned so tightly that they are mutually contiguous, a plurality of these warp filaments then being conducted through a reed aperture, but singly through different heddles and also singly bound round the weft filaments which are introduced at a relatively large mutual spacing. Such a fabric is called a "reverse plain Dutch weave". These known filaments have a uniform pore size and consequently also a filter gauge which is uniform over the entire area of the fabric.

The known filter fabrics have the disadvantage, that they are relatively expensive and that the throughput or the sum of all the filter apertures is relatively small in relation to the area of the filter fabric. The free filter cross-section as well as the filter gauge are determined by the size of the apertures in the wedge-shaped interstices or triangular pores of the fabric which are each formed by a thicker filament and two adjacent, phase-displaced, thinner filaments. By means of the so-called glass bead test the filter gauge of such a filament fabric is determined by means of a model test, by measuring the diameter of the largest of the spheres which pass through the apertures of the wire fabric. In order to produce a filter fabric of predetermined filter gauge, the relationships between the diameter of the measuring sphere, the diameter of the thicker filaments which determine the safe stress of the fabric and the mutual spacing between the thinner filaments as well as the diameter of the thinner filaments are also determined, using a model to a very much enlarged, e.g. 1:1000, scale.

It has been found that in all known filter fabrics the proportion of the free throughput cross-section of the area of the filter fabric is less than 30%.

SUMMARY OF THE INVENTION

The object of the present invention is to create a filter fabric in which the ratio of the free throughput cross-section to the area of the fabric is more favourable than in known filter fabrics, so that the filter resistances are also considerably reduced and the capacity to accommodate contaminants is increased many fold.

This object is, in accordance with the invention, fulfilled by providing that the diameter $d$ of the thinner filaments is smaller than 1.2 times the diameter $\mu$ of the thickest measuring sphere which passes through the triangular pores of the fabric, suitably $d$ is between 0.9 and 1.2$\mu$ preferably between 0.7 and 1.0 $\mu$.

In the filter fabric embodying the invention the free filter cross-section is at least 40% larger than in the case of the known filter fabrics. Since in the case of the filter fabric embodying the invention the thinner filaments are, for any given filter gauge, 20 to 60% thinner than those of the known filter fabrics, the number of the triangular pores, and consequently also the sum of the free throughput apertures, is, in the filter fabric embodying the invention, increased by approximately the corresponding percentage.

BRIEF DESCRIPTION OF THE DRAWINGS

In the following description several embodiments of the filter fabric according to the invention are explained in greater detail with reference to the drawings. The drawings show in FIG. 1 a sectional view of part of a fabric, in which the section is taken at right angles to the thick filaments, FIG. 2 a sectional view of part of a fabric, in which the section is taken at right angles to the thinner filaments, FIG. 3 a plan view of the part of the fabric shown in FIG. 1 and FIG. 2 and FIG. 4 a triangular pore formed by two thin filaments, FIG. 5 a sectional view corresponding to FIG. 1 of a part of a fabric, whose thinner filaments are flattened at their intersections, FIG. 6 a view on the section line VI—VI in FIG. 5, FIG. 7 a plan view of the part of the fabric shown in FIG. 5 and FIG. 6, FIG. 8 a view on the section line VIII—VIII in FIG. 5, FIGS. 9 to 12 sectional views corresponding to FIG. 1 of a filter fabric whose thicker filaments are non-circular, FIG. 13 a view of the triangular pore, formed by a thick filament and two thin filaments, of the part of the fabric shown in FIG. 12.

DESCRIPTION OF THE PREFERRED EMBODIMENTS

Figure 9:
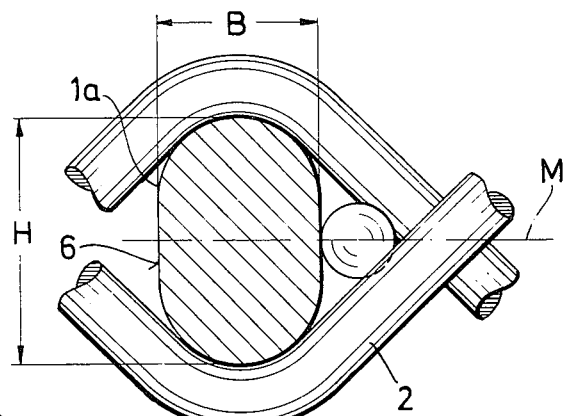

An advantageous filter fabric is produced where the diameter of the thinner filaments substantially equals the diameter $\mu$ of the measuring sphere which determines the filter gauge, and the mutual spacing between the thicker filaments is so chosen that the shape of the triangular pores in the fabric is as nearly as possible an equilateral triangle. In such a fabric the ratio of the maximum safe stress and of the sum of the free filter cross-sections to the weight of the filter fabric is at its most favourable.

In accordance with a further development of the invention, the diameter $d$ of the thinner filaments is somewhat smaller than the diameter $\mu$ of the largest measuring sphere which passes through the smallest pore cross-sections or triangular pore apertures in the scale model test. This fabric has the considerable advantage that the filter cake very readily lifts off the fabric. It will be appreciated that in the case of the known filter fabrics the particles which are to be held back become lodged in the pores which are each formed by a thick filament and two thinner filaments and are not readily flushed out of the interior of the fabric. In the filter fabric embodying the invention, on the other hand, the filtered off sediments do not penetrate into the filter fabric, but are caught on the surface of the filter fabric between the thinner filaments of the fabric, so that they are readily flushed off the filter fabric. In this fabric the capacity to accommodate contaminants is increased on the one hand by the fact that the number of pores per unit area is increased and on the other hand by the fact that a pore cannot be blocked by just a single particle of the contaminant, but only by a plurality of contaminant particles deposited above every pore on the gap formed by two in-phase thinner filaments.

In filter fabrics, whose thicker filaments have a diameter 2 to 2.5 times the diameter $\mu$ of the largest of the measuring spheres which passes through this fabric, the pitch between the thicker filaments is desirably 7.15 to 6.8 times the diameter $\mu$ of the measuring sphere. The values of the pitch stated are in the higher region of the value range where the diameter of the thinner filaments is equal to or somewhat larger than the diameter $\mu$ of the measuring sphere. If the diameter of the thinner filaments is smaller than the diameter $\mu$ of the measuring sphere, the pitches required are in the lower region of the values stated.

In the following table the relationships between the diameter D of the thicker filaments and the respective pitch-spacing $t$ required are given, viz. for filter fabrics whose thinner filaments have a diameter which is 0.75 to 1.1 times the diameter of the measuring sphere which passes through the triangular pores:

$D$ = 2.0 to 2.5 times $\mu$   $t$ = 7.15 to 6.80 times $\mu$
2.5 to 3.0 times $\mu$   6.80 to 7.10 times $\mu$
3.0 to 3.5 times $\mu$   7.10 to 7.35 times $\mu$
3.5 to 4.0 times $\mu$   7.35 to 7.70 times $\mu$ It is a further object of the invention to improve the new filter fabric in such a way that the smallest pore cross-sections of the fabric are effectively protected from blockage even when the diameter of the thinner filaments is larger than the diameter of the measuring sphere which passes through the smallest pore cross-section.

This object is fulfilled by providing the thinner filaments or wires at their intersections with trough-shaped flats on both sides thereof, to which the flats on each of the adjacent thinner filaments or wires are contiguous and the width of the gaps leading to the narrowest pore cross-sections and formed by each of two thinner, in-phase filaments are smaller than the diameter $\mu$ of the largest measuring sphere which passes through the narrowest pore cross-section.

Suitably, the flats on both sides of the thinner filaments are produced by hard impact of the thinner filaments introduced in the form of weft filaments. With every weft insertion, a thinner filament can be thrown so hard against the edge of the product by a reed that this filament and the adjacent filament become plastically deformed at their points of contact and form trough-shaped flats whose arc height or chord height amounts to at least two percent of the diameter of the thinner filaments.

In this way it becomes possible to form gaps above each pore whose width is somewhat smaller than the diameter $\mu$ of the measuring sphere, even using thinner filaments made, for example, of polyamide, whose diameter is up to 3 times greater than the diameter $\mu$ of the largest measuring sphere which passes through the narrowest cross-section of the triangular pores. This has the considerable advantage that filter fabrics of different filter gauge can be woven using thinner filaments of the same diameter $d$. This results in a simplification of the support structure of the steel wires or plastics filaments and in shorter tooling-up times when the loom is required to weave fabrics or different filter gauge.

A further advantage resides in the fact that, in the manufacture of filter fabrics of very fine filter gauge, e.g. of 15 to 20 micron, it is not necessary to use correspondingly thin and consequently disproportionately expensive filaments. Moreover it is now possible also to produce filter fabrics of adequate safe stress and fine filter gauge by the use of plastic filaments. This filter fabric can be produced with great accuracy. Insofar as steel wires are used for thin filaments, these can, without difficulty, be hit so hard that flats having an arc height of 0.06$d$ are produced at the intersections. In this case the gaps leading to the triangular pores of the fabric are narrower than the diameter of the measuring sphere, although the diameter $d$ of the thinner filament is 20% larger than the diameter $\mu$ of the measuring sphere. Finally, this fabric has the advantage that for any given filter gauge the filter fabric has a greater safe stress and that it is inherently more rigid.

The ratio of the free throughput cross-section to the area of the filter fabric can be further improved by making the cross-section of the thicker filaments non-circular and preferably making the cross-sectional width B disposed in the plane of the fabric 30 to 70% smaller than the cross-sectional height H disposed perpendicular to the plane of the fabric.

The cross-section of the thicker filaments may be flattened laterally by parallel planes, or it may be oval. It may also be particularly advantageous for the width of the cross-section of the thicker filaments to decrease towards the central plane of the fabric.

By means of this construction, the free throughput cross-section increases in proportion to the reduction in the width of the thicker filaments which determine the rigidity of the fabric. Since the thicker filaments of the fabric are stressed only substantially at right angles to the plane of the fabric and the reaction moment of the thicker filaments accommodating this stress is substantially maintained, an appreciable increase in the free throughput cross-section and hence an appreciable reduction in the filter resistance is achieved by these means, whilst the rigidity and maximum safe stress of the fabric are maintained.

The filter fabric consists of a system of thicker filaments 1, which are mutually equally spaced by distances $t$ and a system of thinner filaments 2, which extend at right angles to the thicker filaments 1 and which embrace the thicker filaments. The thinner filaments 2 are mutually directly adjacent. A triangular pore 3, whose throughput aperture determines the filter gauge, is formed in the interior of the fabric between each of a thicker filament 1 and two mutually intersecting, phase-displaced, thinner filaments 2. The filter gauge is determined, in a model test, by the diameter of the largest measuring sphere 4 which passes through the triangular pore 3. If this measuring sphere has a diameter of 80 micron, then the filter gauge of the fabric concerned is stated to be 80 micron.

The drawings illustrate, dimensionally, certain especially preferred relationships. They are not intended to limit the scope of the invention to these dimensional relationships.

In the embodiment of fabric illustrated according to FIGS. 1 to 4, the diameter $d$ of the thinner filaments 2 is approximately 20% smaller than the diameter $\mu$ of the measuring sphere 4 and the shape of the pore 3 in the fabric is as nearly as possible an equilateral triangle. The pitch $t$ or spacing between the axes of the thicker filaments 1 is 7.2 times the diameter $\mu$ of the measuring sphere 4 and the diameter D of the thicker filaments 1 is 3.6 tmes the diameter $\mu$ of the measuring sphere 4.

A further specific embodiment is illustrated in FIGS. 5–8.

In the filter fabric according to FIGS. 5 to 8 the pitch t of the thicker filaments 1 is approximately 2.1 times the diameter D of the thicker filaments 1 which in turn is 4.1 times the diameter d of the thinner filaments 2. Moreover the diameter of the thinner filaments 2 is approximately 10% larger than diameter $\mu$ of measuring sphere 4 or $t = 7.85\mu$. Width S of gap 10 between two adjacent thinner filaments 2 exending in phase is somewhat smaller than the diameter $\mu$ of the measuring sphere 4, so that contaminant particles of an appropriate size are trapped on the fabric in the gaps 10. At their intersections, the thinner filaments 2 have trough shaped flats 11, to which the flat 11 of a respective one of adjacent phase-displaced thinner filaments 2 is contiguous. Since $S = d - 4h$, if the arc or segment height h of flat 11 is 12.5% of diameter d of the thinner filaments, then the width of the gaps 10 is half that of the thinner filaments 2. In the filter fabric shown the arc height of the flat is 0.07d and the width S of the gaps 10 is 0.72d.

Yet a further set of embodiments is shown in the fabric according to FIGS. 9 to 12, the width B of the cross-section of the thicker filaments of wires 1a, 1b, 1c, 1d disposed in the central plane M of the fabric is preferably 30% to 60% smaller than the cross-sectional height H disposed at right angles to the fabric plane. In FIG. 9 the cross-section of the thicker wires 1a is flattened by parallel planes 6, which are, for example, produced by flat rolls.

Figure 10:
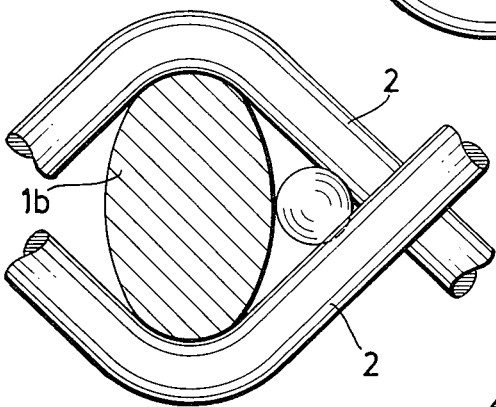

In FIG. 10 the cross-section of the thicker filaments 1b is oval.

Figure 11:
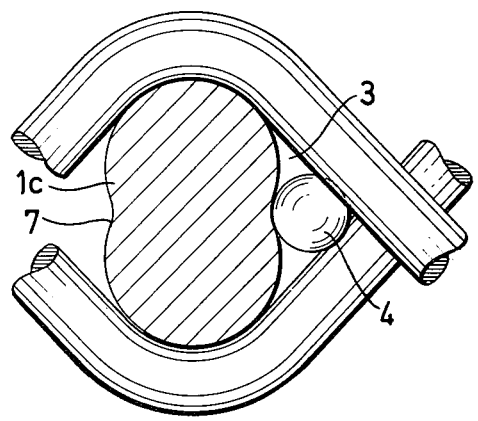

In FIG. 11 the cross-section of the thicker filaments 1c is in the form of a figure-of-eight.

Figure 12:
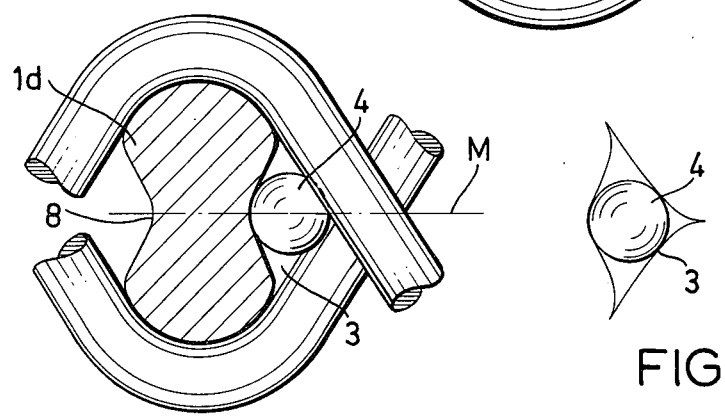
Figure 13:
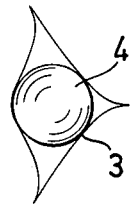

In FIG. 12 the cross-section of the thicker filaments 1d is in the form of a diabolo so that for any given amount of material the reaction moment about the transverse axis disposed in the central fabric plane M is as large as possible. The cross-section of the thicker filaments 1c and 1d in accordance with FIGS. 11 and 12 decreases towards the central fabric plane and the waists 7 and 8 formed thereby have a radius of curvature which is substantially equal to the radius $\mu/2$ of the measuring sphere 4 which passes through the triangular pores.

The thicker, profiled wires may be rolled or drawn through dies or drawing plates. For the weaving operation, the profiled wires 1a–1d may constitute the warp filaments. The fabric may alternatively be produced on a shuttle loom in which a shuttle or a harpoon draws in the thicker wires 1a–1d as weft filaments on one or two sides. The fabrics embodying the invention may also be used as highly stressed sieve fabrics, so long as metal or plastics filaments or wires of appropriate thickness are woven and so long as the gap S between the thinner filaments 2 is smaller than the diameter $\mu$ of the largest measuring sphere 4 which passes through the triangular pores 3.

I claim:

1. In a filter fabric composed of single strand filaments consisting of filaments disposed in a first system intersecting with a second system,
the filaments in said first system being thicker than the filament in said second system,
said first system consisting of a plurality of mutually equidistantly spaced filaments,
the axes whereof lies substantially in a common plane,
said second system consisting of a plurality of filaments disposed in substantially sinusoidal form,
adjacent filaments in said second system being juxtaposed in contact with each other substantially at 0° and 180° points on said sinusoidal curve,
said mutually adjacent filaments being displaced exactly out of phase to provide interstices of equal cross-sectional area and shape therebetween,
said second system interacting with said first system in a manner that the filaments of said first system are embraced in the interstices formed between the filaments of said second system,
the apertures in said filter fabric having substantially triangular cross-section, the sides of said triangle being defined by the inner edges of any predetermined adjacent pair of thinner filaments and the corresponding thicker filament embraced in the interstices therebetween, said thinner filaments being designated as having a diameter d, said thicker filaments being designated as having a diameter D and the pitch between the axes of said thicker filaments being designated as t, the filter gauge of said filter fabric being defined as the diameter of the sphere to which all the edges of said triangular aperture formed by said two thinner and one thicker filaments are tangential, the diameter of said sphere being designated as $\mu$, the improvement which comprises
providing the maximum distance between the mutually facing surfaces of any predetermined pair of adjacent mutually contacted, out of phase, thinner filaments of said second system, between which a thicker filament of said first system is disposed, designated as H, is greater than the cross-sectional width, designated as B, of said thicker filament measured in the common plane of axes of said first system of thicker filaments,
providing the filaments in such a relationship that d is between 0.7 $\mu$ and 1.2 $\mu$, and 1.2 $\mu$, and the relationship between the pitch-spacing of the thicker filaments t to the diameter of the thicker filaments D corresponds to the following Table:

Where D is: then t is:
2 to 2.5 times $\mu$    7.15 to 6.8 times $\mu$
2.5 to 3 times $\mu$    6.8 to 7.1 times $\mu$
3 to 3.5 times $\mu$    7.1 to 7.35 times $\mu$
3.5 to 4 times $\mu$    7.35 to 7.7 times $\mu$.

2. A filter fabric according to claim 1, characterized in that 1.2 $\mu$ > d > 0.9 $\mu$.

3. A filter fabric according to claim 1, characterized in that 1.0 $\mu$ > d > 0.7 $\mu$.

4. A filter fabric according to claim 1, characterized in that the mutual relationship of the sides of the triangular pores in the fabric is substantially that of an equilateral triangle.

5. A filter fabric according to claim 1 wherein 0.7 H > B > 0.3 H.

6. A filter fabric according to claim 5, characterized in that the cross-section of the thicker wires is flattened laterally by parallel planes.

7. A filter fabric according to claim 5, characterized in that the cross-section of the thicker wires is oval.

8. A filter fabric according to claim 5, characterized in that the width B of the cross-section of the thicker wires decreases towards the central plane of the fabric.

* * * * *